United States Patent [19]
Franz

[11] 3,851,899
[45] Dec. 3, 1974

[54] MEANS FOR SEALING FITTINGS AND NOZZLE ASSEMBLIES AT EXTREMELY HIGH FLUID PRESSURES

[76] Inventor: Norman C. Franz, 1203-4665 W. 10th Ave., Vancouver 8, British Columbia, Canada

[22] Filed: Aug. 28, 1972

[21] Appl. No.: 283,971

Related U.S. Application Data

[60] Division of Ser. No. 163,456, July 16, 1971, Pat. No. 3,705,693, which is a continuation of Ser. No. 876,301, Nov. 13, 1969, abandoned.

[52] U.S. Cl. ................................ 285/95, 285/355
[51] Int. Cl. ............................................ F16l 17/00
[58] Field of Search ............ 285/95, 113, 336, 355, 285/349, 220, 332.2, 350, 333, 334

[56] References Cited
UNITED STATES PATENTS

| | | | |
|---|---|---|---|
| 2,493,996 | 1/1950 | Parmesan | 285/113 |
| 2,525,799 | 10/1950 | Hecker | 285/113 |
| 3,372,948 | 3/1968 | Arneson | 285/174 |
| 3,567,258 | 3/1971 | Scaramucci | 285/349 |
| 3,591,208 | 7/1971 | Nicolaus | 285/349 |

*Primary Examiner*—Reinaldo P. Machado
*Attorney, Agent, or Firm*—Miller, Morriss, Pappas & McLeod

[57] ABSTRACT

Means for sealing joints subjected to extremely high fluid pressures in the order of seventy thousand pounds per square inch wherein an elastic member is provided which is disposed between and initially subjected to moderate mechanical pressure by the components of the joint to be sealed and subsequently subected to extremely high fluid pressure whereby the elastic member is deformed between the components of the joint so as to seal the joint against leakage.

3 Claims, 2 Drawing Figures

MEANS FOR SEALING FITTINGS AND NOZZLE ASSEMBLIES AT EXTREMELY HIGH FLUID PRESSURES

This is a Division of Application Ser. No. 163,456 filed July 16, 1971, now U.S. Pat. No. 3,705,693 which is a Continuation of Application Ser. No. 876,301, filed Nov. 13, 1969, now abandoned This invention relates to means for sealing joints subjected to extremely high fluid pressures in the order of seventy thousand pounds per square inch and, more particularly, to an improved means for sealing fittings and nozzle assemblies at extremely high fluid pressures.

Heretofore, various methods and apparatus have been proposed for cutting, piercing, separating or otherwise penetrating various materials such as precipitation-hardening stainless steels, titanium and titanium alloys, high strength alloy steels, wood, cardboard and various other materials by means of a supersonic jet of liquid initially pressurized to thousands of atmospheres of pressure and subsequently discharged through a nozzle at supersonic velocities. Representative methods and apparatus are disclosed, for example, in United States letters Pat. Nos. 2,985,050 and 3,212,378 and in the applicant's co-pending application Ser. No. 733,495 filed May 31, 1968, now U.S. Pat. No. 3,524,367. As shown in this patent, the high fluid pressures with which this invention is concerned begin at about 10,000 pounds per square inch. However, in apparatus of the indicated character difficulties have been encountered in sealing the joints where two or more components which are subjected to high fluid pressures are brought together, such as at fittings and nozzle assemblies.

Heretofore various methods and apparatus have also been proposed to effecting fluid tight seals at joints subjected to extremely high fluid pressures. However, prior seals of the indicated character are relatively expensive and require special, costly components and precision machining of the components of the joint. Moreover prior seals of the indicated character are not well suited for frequent disassembly or the joining of more than two components in a single joint. Heretofore, in joints between high pressure tubing and fittings, a frusto-conical or tapered joint has been commonly used but such joints have been very unsatisfactory where relatively large sealed areas are involved. Moreover such prior frusto-conical or tapered joints are subject to damage when leakage occurs thereby requiring the remachining of the joined surfaces. In addition in order to produce the initial seal the components of the joint must be initially subjected to very high forces and stresses.

An object of the present invention is to overcome disadvantages in prior joints of the indicated character and to provide an improved means for sealing joints subjected to extremely high fluid pressures.

Another object of the invention is to provide an improved means for sealing fittings and nozzle assemblies that is simple in construction, economical to manufacture, durable, efficient and reliable in operation.

Another object of the invention is to provide improved means for obtaining seals of the indicated character easily and economically.

Another object of the invention is to provide an improved sealing means whereby fluid tight seals can be obtained against extremely high pressures with only manual tightening of the components of the joint and without requiring the use of wrenches and similar tools.

Another object of the invention is to provide an improved fluid tight seal which can be assembled and disassembled repeatedly with great ease and rapidity.

Another object of the invention is to provide an improved seal which does not require complex or precision machined components and which may be obtained by and renewed by replacement of a relatively inexpensive readily available sealing member.

Another object of the invention is to provide an improved means for sealing relatively large areas at extremely high pressure as well as complex joints involving the juncture of more than two components.

Another object of the invention is to provide an improved means for sealing joints which eliminates the need for precision parts, permits high pressure seals to be obtained without applying large forces or stresses to the components of the joint, permits frequent and rapid assembly and disassembly, and is effected by means of an easily replaced and inexpensive part.

The above as well as other objects and advantages of the present invention will become apparent from the following description, the appended claims and the accompanying drawing.

Figure 1:
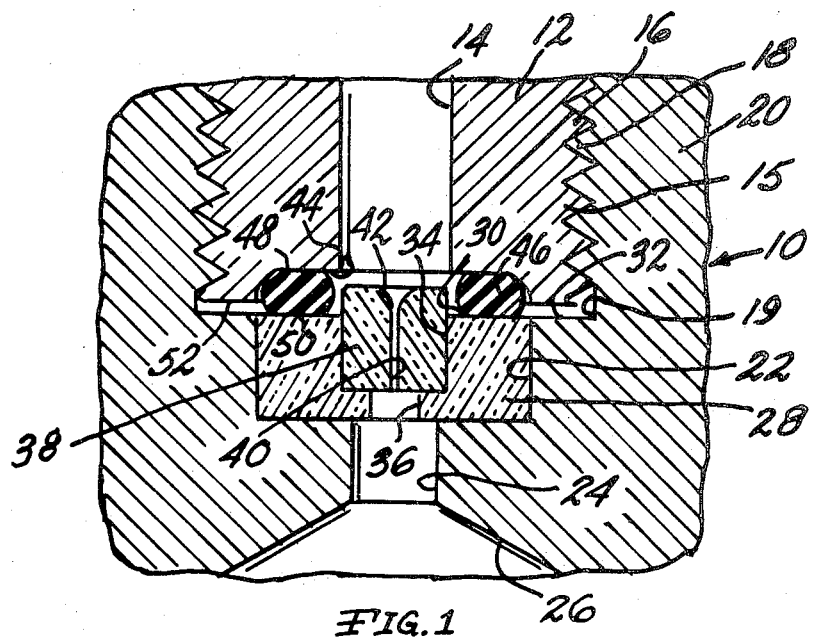
FIG. 1 is a sectional view of one embodiment of the invention.

Referring to the drawings and more particularly to FIG. 1 thereof, the present invention is shown embodied in a nozzle assembly, generally designated 10, which is particularly adapted for use in producing high velocity fluid jets and may be used, for example, in apparatus of the types disclosed in the aforementioned United States Letters Patent and in practicing the methods disclosed in the aforementioned co-pending application of the applicant, although it will be understood that the present invention is applicable to other uses.

As shown in FIG. 1, the nozzle assembly 10 is comprised of a high pressure tubular member 12 which may be formed of steel or other suitable material having sufficient strength to withstand the high fluid pressures exerted thereon, the tubular member 12 defining an internal passageway 14 adapted to be connected to a source of fluid pressure (not shown). The periphery of the end portion 15 of the tubular member 12 is provided with a conventional external thread 16 adapted to mate with an internal thread 18 provided in a stepped bore 19 defined by a nozzle holder 20, the threads 16 and 18 permitting assembly and disassembly of the high pressure tubular member and the nozzle holder 20. The nozzle holder 20, which is also preferably made of steel or other suitable material having sufficient strength to withstand the forces exerted thereon, defines a reduced diameter counterbore portion 22 communicating with a coaxially aligned outlet passageway 24 which terminates in a flared outlet 26.

A nozzle retaining member 28 is provided which may be formed of brass or other suitable material, the retaining member having a close fit in the counterbore portion 22 of the nozzle holder 20. The retaining member 28 is disposed so that the upper surface 30 thereof, as viewed in FIG. 1, is substantially flush with the shoulder 32 of the nozzle holder 20. The retaining member 28 defines a counterbore 34 communicating with a coaxially aligned passageway 36, the passageway 36 in turn communicating with the passageway 24 defined by the nozzle holder 20. A nozzle insert 38 is provided the lower portion of which, as viewed in FIG. 1, is disposed in the counterbore 34 defined by the retaining member 28, the insert 38 having a press fit in the counterbore 34. The insert 38 may be formed of sapphire, glass or other suitable material and defines a jet forming orifice having an elongate throat portion 40 smoothly blending with an entry chamber 42, the chamber 42 and the throat portion 40 preferably being perfectly circular in transverse cross section with a smooth surface finish whereby fluid under extremely high pressure may be ejected from the throat portion 40 in the form of a jet traveling at supersonic velocity.

The inner end portion 15 of the tubular member 12 defines a semitoridal groove 44 which communicates with the bore 14 defined by the member 12, the periphery of the groove 44 terminating in spaced relationship with respect to the root of the external thread 16. An O-ring 46, formed of rubber or other suitable elastic material, is disposed in the groove 44 intermediate the member 12 and the retaining member 28, the depth of the groove 44 being less than the thickness of the O-ring 46 measured axially of the latter. Hence, as shown in FIG. 1, the O-ring upper surface 48 abuts the adjacent surface of the member 12 defining the groove 44 while simultaneously the O-ring lower surface 50 abuts the upper surface 30 of the retaining member 28 and the end surface 52 of the tubular member 12 is spaced from the nozzle holder shoulder 32 by a space bounded along its inner and outer circumferences by the O-ring 46 and the wall of the bore 19. Moreover, as shown in FIG. 1, the location of the O-ring 46 enables such to prevent fluid passage between the member 12 and the retaining member 28 and body 10 while simultaneously preventing fluid passage through the counterbore 22 around the retaining member 28.

In assembling the embodiment of the invention illustrated in FIG. 1, the nozzle insert 38 is fitted in the retaining member 28 in fluid tight relationship therewith and the retaining member 28 is fitted into the counterbore 22 defined by the nozzle holder 20 in fluid tight relationship with the nozzle holder 20 and in a manner well known in the art. The O-ring 46 is then fitted in the groove 44 after which the tubular member 12 is manually screwed into the nozzle holder 20 through the agency of the external thread 16 mating with the internal thread 18 until the O-ring is placed under moderate compression between the tubular member 14 and the retaining member 28 to effect the initial seal between the tubular member 12 and the nozzle holder 20. Under high fluid pressures, the elastic O-ring 46 is deformed and may partially extrude into the aforementioned surrounding space to effectively seal the joint between the member 12 and the retaining member 28 and body 12 while simultaneously sealing the counterbore 22 around the retaining member 28. Also, as will be noted, the sealing action increases as the fluid pressure increases, and due to the construction and relatively small size, a seal between the nozzle 38 and the retaining member 28 may be readily obtained as a result of pressure area differential.

Unexpectedly, it has been found that fluid pressures of seventy thousand pounds per square inch may be easily sealed using only finger tightened pressures on the threaded connection between the members 12 and 20. Moreover a single embodiment of this invention has been assembled and disassembled thousands of times with the only required repair being the replacement of the O-ring member 46 at relatively little cost.

Figure 2:
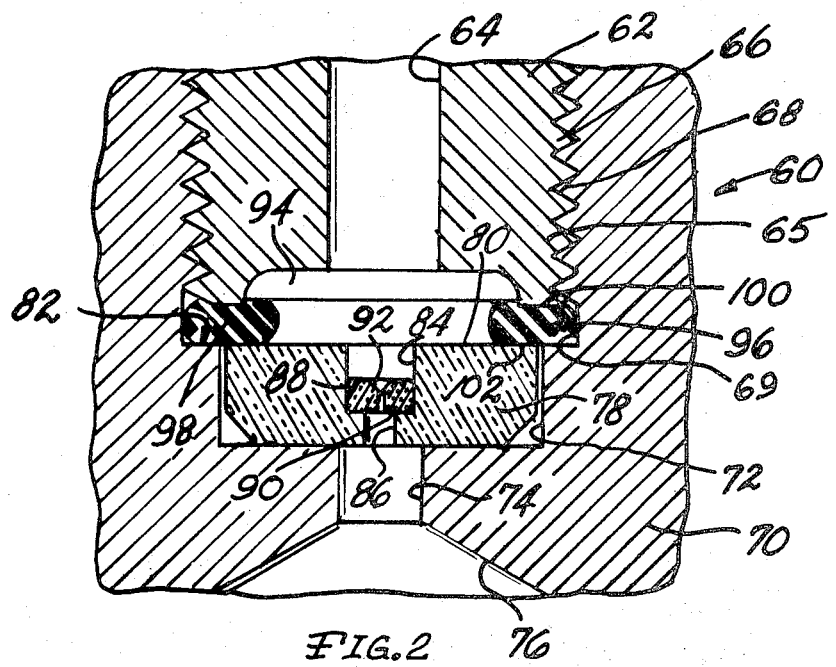
FIG. 2 is a sectional view of another embodiment of the invention.

Another embodiment of the invention is illustrated in FIG. 2 wherein a fluid tight seal is effected in a complex joint involving the juncture of more than two components. In the embodiment of the invention illustrated in FIG. 2, a nozzle assembly, generally designated 60, is provided which is comprised of a tubular member 62 which may be formed of steel or other suitable material having sufficient strength to withstand the high fluid pressures thereon, the tubular member 62 defining an internal passageway 64 adapted to be connected to a source of fluid pressure (not shown). The periphery of the end portion 65 of the tubular member 62 is provided with a conventional external thread 66 adapted to mate with an internal thread 68 provided in a stepped bore 69 defined by a nozzle holder 70, the threads 66 and 68 permitting assembly and disassembly of the high pressure tubular member 62 and the nozzle holder 70. The nozzle holder 70, which is also preferably made of steel or other suitable material having sufficient strength to withstand the high pressures exerted thereon, defines a reduced diameter counterbore portion 72 and a coaxially aligned outlet passageway 74 which termiantes in a flared outlet 76.

A nozzle retaining member 78 is provided which may be formed of brass or other suitable material, the retaining member 78 having a loose fit in the counterbore portion 72 of the nozzle holder 70. The retaining member 78 is disposed so that the upper surface 80 thereof, as viewed in FIG. 2, is substantially flush with the shoulder 82 of the nozzle holder 70. The retaining member 78 defines a counterbore 84 communicating with a coaxially aligned passageway 86, the passageway 86 in turn communicating with the passageway 74 defined by the holder 70. A nozzle insert 88 is provided which is disposed in the counterbore 84 defined by the retaining member 78, the insert 88 having a press fit in the counterbore 84. The insert 88 may be formed of sapphire, glass or other suitable material and defines a jet forming orifice having a throat portion 90 and an entry chamber 92, the chamber 92 and the throat portion 90 preferably being perfectly circular in transverse cross section with a smooth surface finish whereby fluid under extremely high pressure may be ejected from the throat portion 90 in the form of a jet traveling at supersonic velocity.

The inner end portion 65 of the tubular member 62 defines a semitoroidal groove 94 which communicates with the bore 64 defined by the member 62, the periphery of the groove 94 terminating in spaced relationship with respect to the root of the external thread 66. An O-ring 96 is provided which may be formed of rubber or other suitable elastic material. In this embodiment of the invention, the O-ring 96 is disposed between the end surface 98 of the tubular member 62 and the surfaces 80 and 82 of the retaining member 78 and nozzle holder 70, respectively, the upper surface 100 of the O-ring abutting the surface 98 of the tubular member 62 while the lower surface 102 of the O-ring abuts the adjacent surfaces 80 and 82 of the retaining member 78 and the holder 70, respectively.

The O-ring 96 is thus adapted to seal the joint between the tubular member 62 and the nozzle holder 70 as well as the joints between the tubular member 62 and the nozzle retainer 78 and the joint between the nozzle retainer 78 and the nozzle holder 70.

In the assembly of this embodiment of this invention, the nozzle 88 is inserted in the retainer 78 in fluid tight relationship and the retainer 78 is loosely inserted in the counterbore 72 defined by the member 70 after which the O-ring 96 is inserted into the bore 69 of the nozzle holder 70 so that the lower surface 102 of the O-ring bears against the upper surfaces 80 and 82 provided on the retaining member 78 and nozzle holder 70, respectively. The tubular member 62 is then screwed into the member 70 through the agency of the threads 66 and 68 and manually tightened until moderate pressure is applied to the O-ring by the end surface 98 of the tubular member so as to effect an initial sealing of the joint. When the assembly is subjected to relatively high pressure in the order of seventy thousand pounds per square inch, the elastic O-ring 96 is deformed and may partially extrude to effectively seal the entire joint comprising the members 62, 70, and 78. Such a construction serves to distribute the forces and stresses among the components comprising the joint and obviates the cracking of the nozzle insert 88 since high pressures are not applied to the periphery of the retainer 78.

From the foregoing it will be apparent that the present invention provides means for sealing joints subjected to relatively high fluid pressures whereby only finger tightening of the components is necessary to effect the seal and high pressure seals may be obtained at complex joints involving the juncture of more than two components. Moreover the present invention obviates the necessity of utilizing precision parts or the application of large forces and high stresses at the joint and permits the use of brittle nozzle inserts at very high driving pressures to produce high velocity fluid jets.

While preferred embodiments of the invention have been illustrated and described, it will be understood that various changes and modifications may be made without departing from the spirit of the invention.

Having thus described my invention, I claim:

1. In a high pressure fitting, the combination including a pair of tubular elements each having a body defining a fluid passageway, said bodies having spaced confronting surfaces, an annular elastic sealing member disposed between and engageable with said confronting surfaces having at least an inside portion exposed to said fluid passageways, and means for mechanically joining said bodies together forming a joint which allows high pressure fluid leakage between the spaced confronting surfaces of said bodies to the joint between the joining means and the tubular elements without the sealing member whereby said confronting surfaces engage said sealing member with a moderate compression comparable to a finger tightening of a threaded joint between the tubular elements and joining means, and said tubular elements, sealing member and joining means define a space between the spaced confronting surfaces of the tubular elements deforming the sealing member adjacent its outer periphery towards the joint between the joining means and the tubular elements upon application of a high fluid pressure from about 10,000 to in the order of 70,000 pounds per square inch inside the tubular elements to produce a fluid tight seal of the joint.

2. A high pressure fitting according to claim 1, wherein said sealing member is in the form of an O-ring.

3. A high pressure fitting according to claim 1, wherein an end portion of one of said tubular elements defines a semi-toroidal groove communicating with said passageways, and said sealing member is in the form of an O-ring having a portion thereof disposed in said groove.

* * * * *